US011729650B2

(12) United States Patent
Santhanam et al.

(10) Patent No.: US 11,729,650 B2
(45) Date of Patent: Aug. 15, 2023

(54) NEIGHBOR MEASUREMENT ADJUSTMENT FOR DUAL CONNECTIVITY

(71) Applicant: QUALCOMM Incorporated, San Diego, CA (US)

(72) Inventors: Arvind Vardarajan Santhanam, San Diego, CA (US); Carlos Cabrera Mercader, Cardiff, CA (US); Brian Clarke Banister, San Diego, CA (US); Reza Shahidi, San Diego, CA (US); Leena Zacharias, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 159 days.

(21) Appl. No.: 16/949,823

(22) Filed: Nov. 16, 2020

(65) Prior Publication Data

US 2021/0153050 A1    May 20, 2021

Related U.S. Application Data

(60) Provisional application No. 62/937,233, filed on Nov. 18, 2019.

(51) Int. Cl.
*H04W 4/00* (2018.01)
*H04W 24/10* (2009.01)
(Continued)

(52) U.S. Cl.
CPC ........... *H04W 24/10* (2013.01); *H04L 5/0073* (2013.01); *H04W 72/541* (2023.01)

(58) Field of Classification Search
CPC .... H04W 24/10; H04W 72/082; H04L 5/0073
(Continued)

(56) References Cited

U.S. PATENT DOCUMENTS 6,865,218 B1 * 3/2005 Sourour ............... H04B 1/7117
                                                        375/E1.032
7,340,257 B2 * 3/2008 Heddergott ............. H04L 25/06
                                                        455/67.11
(Continued)

FOREIGN PATENT DOCUMENTS

CA          2945398 C  *  1/2020  ........... H04B 1/1027
EP          3462622 A1 *  4/2019  ............. H04B 1/711
(Continued)

OTHER PUBLICATIONS

International Search Report and Written Opinion—PCT/US2020/070797—ISA/EPO—dated Feb. 25, 2021.

*Primary Examiner* — Thai D Hoang
(74) *Attorney, Agent, or Firm* — Harrity & Harrity, LLP; Dang M. Vo

(57) ABSTRACT

Various aspects of the present disclosure generally relate to wireless communication. In some aspects, a user equipment (UE) may determine, for a combination of a first band and a second band, whether a measurement offset is to be applied for a neighbor measurement on the second band based at least in part on an estimated impact of interference from the first band on the second band; and selectively apply the measurement offset for the neighbor measurement based at least in part on whether the measurement offset is to be applied; or selectively report the measurement offset to a base station associated with the neighbor measurement based at least in part on whether the measurement offset is to be applied. Numerous other aspects are provided.

32 Claims, 5 Drawing Sheets

(51) Int. Cl.
*H04L 5/00* (2006.01)
*H04W 72/541* (2023.01)

(58) Field of Classification Search
USPC .................................. 370/329–330, 335–345
See application file for complete search history.

(56) References Cited

U.S. PATENT DOCUMENTS

| | | | | |
|---|---|---|---|---|
| 7,664,186 | B2* | 2/2010 | Brotje | H04L 1/0045 |
| | | | | 370/344 |
| 2013/0044621 | A1* | 2/2013 | Jung | H04L 5/0007 |
| | | | | 370/336 |
| 2014/0128115 | A1* | 5/2014 | Siomina | H04L 1/0026 |
| | | | | 455/501 |
| 2015/0257165 | A1* | 9/2015 | Gale | H04W 24/08 |
| | | | | 370/329 |
| 2018/0263048 | A1* | 9/2018 | Ingale | H04W 72/1215 |
| 2021/0258849 | A1* | 8/2021 | Kim | H04W 36/0058 |
| 2022/0131630 | A1* | 4/2022 | Ghozlan | H04W 24/08 |

FOREIGN PATENT DOCUMENTS

| | | | | |
|---|---|---|---|---|
| EP | 3462622 | A1 | 4/2019 | |
| EP | 3311519 | B1 * | 10/2019 | ........... H04B 17/318 |

* cited by examiner

NEIGHBOR MEASUREMENT ADJUSTMENT FOR DUAL CONNECTIVITY

CROSS-REFERENCE TO RELATED APPLICATION

This patent application claims priority to U.S. Provisional Patent Application No. 62/937,233, filed on Nov. 18, 2019, entitled "NEIGHBOR MEASUREMENT ADJUSTMENT FOR DUAL CONNECTIVITY," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for neighbor measurement adjustment for dual connectivity (DC).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining, for a combination of a first band and a second band, whether a measurement offset is to be applied for a neighbor measurement on the second band based at least in part on an estimated impact of interference from the first band on the second band; and selectively applying the measurement offset for the neighbor measurement based at least in part on whether the measurement offset is to be applied; or selectively reporting the measurement offset to a base station associated with the neighbor measurement based at least in part on whether the measurement offset is to be applied.

In some aspects, a method of wireless communication, performed by a base station, may include receiving, from a UE, at least one of: a neighbor measurement associated with a measurement offset, or information identifying the measurement offset for the neighbor measurement, wherein the measurement offset is based at least in part on an estimated impact of interference from a first band on a second band, and wherein the neighbor measurement is associated with a frequency on the second band; and configuring a dual connectivity configuration of the UE based at least in part on the neighbor measurement or the measurement offset.

In some aspects, a UE for wireless communication may include memory and one or more processors operatively coupled to the memory. The memory and the one or more processors may be configured to determine, for a combination of a first band and a second band, whether a measurement offset is to be applied for a neighbor measurement on the second band based at least in part on an estimated impact of interference from the first band on the second band; and selectively apply the measurement offset for the neighbor measurement based at least in part on whether the measurement offset is to be applied; or selectively report the measurement offset to a base station associated with the neighbor measurement based at least in part on whether the measurement offset is to be applied.

In some aspects, a base station for wireless communication may include memory and one or more processors operatively coupled to the memory. The memory and the one or more processors may be configured to receive, from a user equipment (UE), at least one of: a neighbor measurement associated with a measurement offset, or information identifying the measurement offset for the neighbor measurement, wherein the measurement offset is based at least in part on an estimated impact of interference from a first band on a second band, and wherein the neighbor measurement is associated with a frequency on the second band; and configure a dual connectivity configuration of the UE based at least in part on the neighbor measurement or the measurement offset.

In some aspects, a non-transitory computer-readable medium may store one or more instructions for wireless communication. The one or more instructions, when executed by one or more processors of a UE, may cause the one or more processors to determine, for a combination of a first band and a second band, whether a measurement offset is to be applied for a neighbor measurement on the second band based at least in part on an estimated impact of interference from the first band on the second band; and selectively apply the measurement offset for the neighbor measurement based at least in part on whether the measurement offset is to be applied; or selectively report the measurement offset to a base station associated with the neighbor measurement based at least in part on whether the measurement offset is to be applied.

In some aspects, a non-transitory computer-readable medium may store one or more instructions for wireless communication. The one or more instructions, when executed by one or more processors of a base station, may cause the one or more processors to receive, from a user equipment (UE), at least one of: a neighbor measurement associated with a measurement offset, or information identifying the measurement offset for the neighbor measurement, wherein the measurement offset is based at least in part on an estimated impact of interference from a first band on a second band, and wherein the neighbor measurement is associated with a frequency on the second band; and configure a dual connectivity configuration of the UE based at least in part on the neighbor measurement or the measurement offset.

In some aspects, an apparatus for wireless communication may include means for determining, for a combination of a first band and a second band, whether a measurement offset is to be applied for a neighbor measurement on the second band based at least in part on an estimated impact of interference from the first band on the second band; and means for selectively applying the measurement offset for the neighbor measurement based at least in part on whether the measurement offset is to be applied; or means for selectively reporting the measurement offset to a base station associated with the neighbor measurement based at least in part on whether the measurement offset is to be applied.

In some aspects, an apparatus for wireless communication may include means for receiving, from a user equipment (UE), at least one of: a neighbor measurement associated with a measurement offset, or information identifying the measurement offset for the neighbor measurement, wherein the measurement offset is based at least in part on an estimated impact of interference from a first band on a second band, and wherein the neighbor measurement is associated with a frequency on the second band; and means for configuring a dual connectivity configuration of the UE based at least in part on the neighbor measurement or the measurement offset.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements").

These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
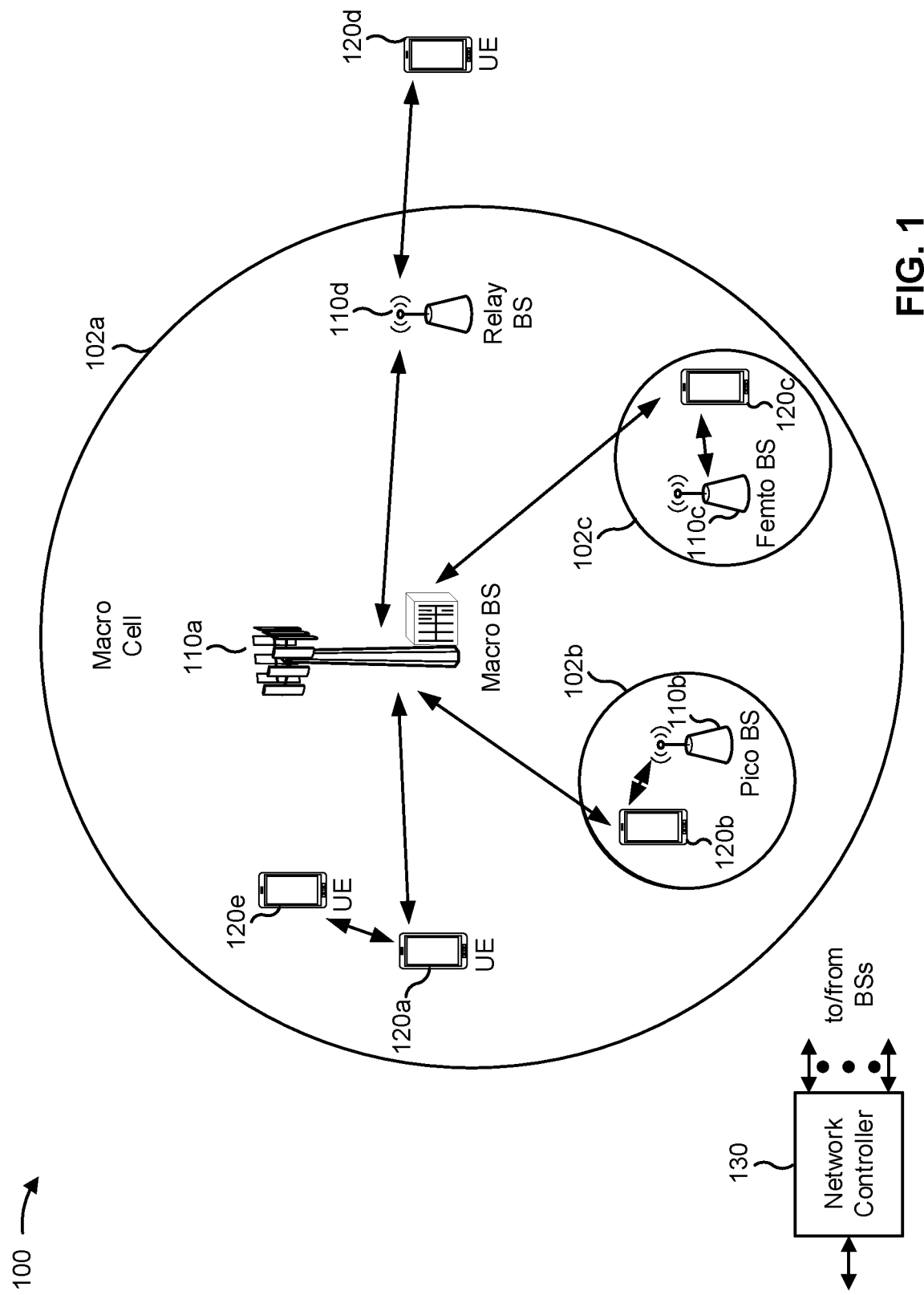
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using one or more operating bands within a first frequency range (FR1), which may span from 410 MHz to 7.125 GHz, and/or may communicate using one or more operating bands within a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
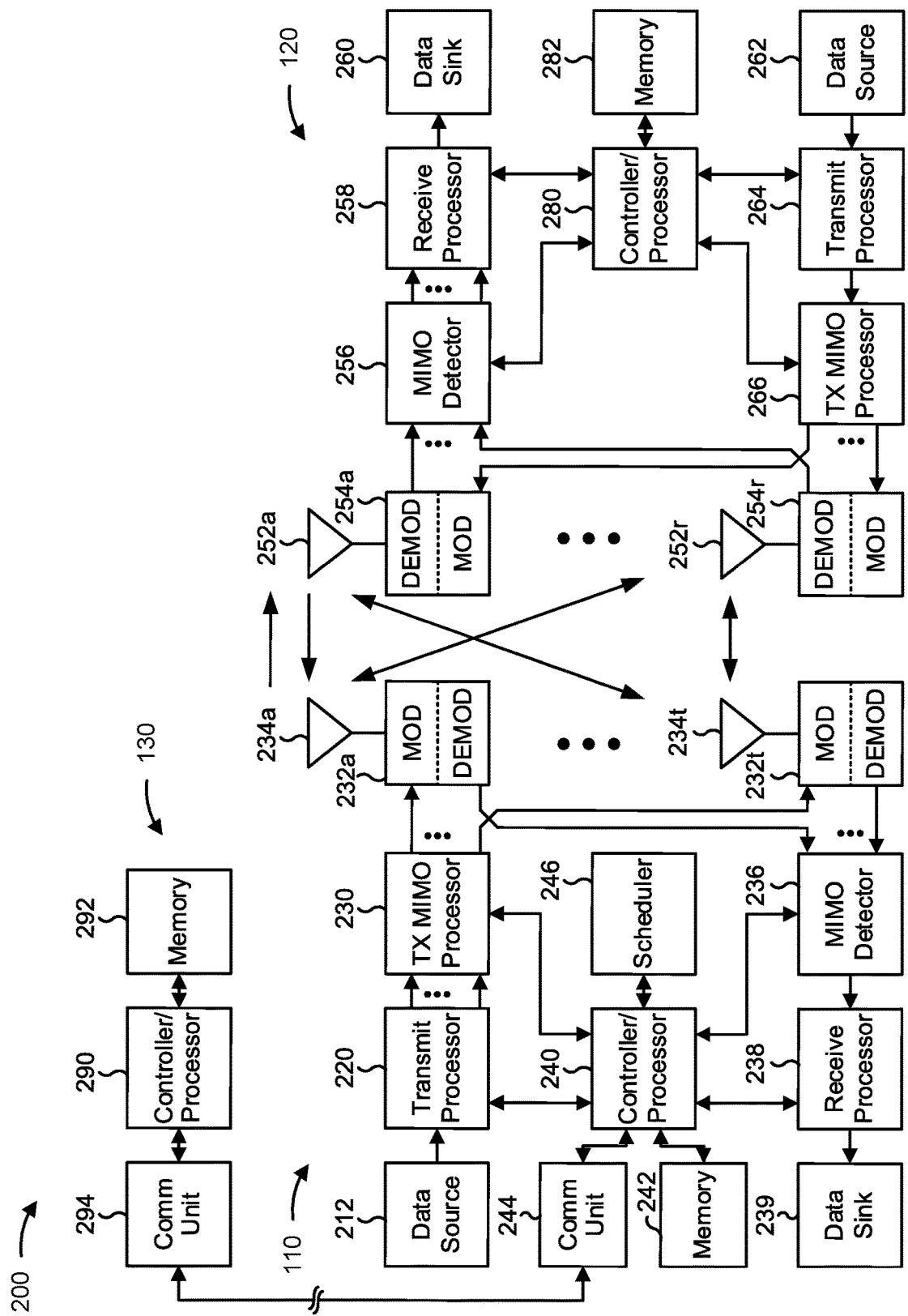
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with neighbor measurement adjustment for dual connectivity, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4, process 500 of FIG. 5, and/or other processes as described herein. A scheduler 246 may schedule UEs for data transmission on the downlink and/or uplink.

In some aspects, UE 120 may include means for determining, for a combination of a first band and a second band, whether a measurement offset is to be applied for a neighbor measurement on the second band based at least in part on an estimated impact of interference from the first band on the second band; means for selectively applying the measurement offset for the neighbor measurement based at least in part on whether the measurement offset is to be applied; means for selectively reporting the measurement offset to a base station associated with the neighbor measurement based at least in part on whether the measurement offset is to be applied; means for determining whether the measurement offset is to be applied for the plurality of neighbor measurements based at least in part on respective estimated impacts of the interference from the first band on the plurality of frequencies; means for applying the measurement offset for a first neighbor measurement of the plurality of neighbor measurements, wherein the measurement offset is not applied for a second neighbor measurement of the plurality of neighbor measurements; means for selecting a frequency, of the plurality of frequencies, based at least in part on a respective estimated impact of the interference on the selected frequency satisfying a threshold; means for reporting the selected frequency to the base station; means for selectively applying the measurement offset for the neighbor measurement; means for selectively reporting the measurement offset to the base station; means for determining the measurement offset; means for receiving a dual connectivity configuration based at least in part on applying the measurement offset to the neighbor measurement or reporting the measurement offset to the base station; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a UE, at least one of: a neighbor measurement associated with a measurement offset, or information identifying the measurement offset for the neighbor measurement, wherein the measurement offset is based at least in part on an estimated impact of interference from a first band on a second band, and wherein the neighbor measurement is associated with a frequency on the second band; means for configuring a dual connectivity configuration of the UE based at least in part on the neighbor measurement or the measurement offset; means for receiving information identifying a selected frequency, of the plurality of frequencies, based at least in part on an estimated impact of the interference on the selected frequency satisfying a threshold, wherein configuring the dual connectivity configuration is based at least in part on the information identifying the selected frequency; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A UE may communicate concurrently using a band combination, such as two or more different bands or two or more frequencies on the same band, using a dual connectivity (DC) configuration. Examples of DC configurations include multi-radio access technology (multi-RAT) dual connectivity (MR-DC), E-UTRA-NR dual connectivity (EN-DC), NR-E-UTRA dual connectivity (NE-DC), and NR dual connectivity (NR-DC). In some cases, a first set of bands (e.g., one or more bands) of a DC configuration may cause interference that impacts a second set of bands (e.g., one or more bands) of the DC configuration. For example, consider a DC configuration with LTE band B3 and NR band N78. In this case, the LTE band B3 uplink, in frequency division duplexing, may be associated with a frequency of 1710-1785 MHz, whereas the NR band N78 may be associated with a frequency of 3300-3800 MHz. In this case, interference from the second harmonic of LTE band B3 transmission may impact NR band N78 reception. When in LTE mode (e.g., using LTE only serving cell(s)), the UE may perform neighbor measurements on NR band N78 using a network configured measurement gap (e.g., a 6 ms measurement gap). Therefore, the UE may not detect the interference, as NR band N78 measurements may not be impacted by LTE band B3 transmissions due to the measurement gap. In this case, the UE may report a satisfactory (e.g., strong) measurement on NR band N78, so the network may configure a cell for which the neighbor measurements were performed on NR band N78 for EN-DC communication. Upon transitioning to EN-DC, the NR band N78's demodulation, intra-frequency measurements, and/or the like, may be subject to signal-to-noise ratio (SNR) degradation of up to, for example, 27 dB. This may lead to lower throughput on the NR band N78's cell.

In the case of self-interference between different bands of a UE, there may be cells on other bands or other carriers on a band that are associated with less favorable neighbor measurement results and that are not impacted as severely as the NR band N78 by the interference. Furthermore, the UE may be handed over to another NR frequency after transitioning to the EN-DC mode on LTE band B3 and NR band N78 if intra-frequency measurements on NR band N78 are impacted by the self-interference while inter-frequency measurements on the other NR frequency are not impacted. This may increase overhead and network congestion, thereby further reducing throughput.

Even further, while the examples described above concern harmonic interference, these issues can also arise due to inter-modulation distortion, modulated spurs associated with a voltage-controlled oscillator or a local oscillator of the UE, UE component design or hardware design (e.g., modulated samples between a beamer and a streamer of the UE), and/or the like, which are all collectively referred to herein as "interference." Furthermore, these issues may apply for various band combinations (e.g., LTE and NR bands, NR Frequency Range (FR) 1 (FR1) and NR FR2, EN-DC (e.g., LTE+FR1) and FR1, EN-DC (e.g., LTE+FR2) and FR2, and/or the like).

Some techniques and apparatuses described herein provide determination of an adjustment for a neighbor measurement, such as a neighbor measurement for an NR band, on a victim frequency of interference associated with another band or the same band. For example, some techniques and apparatuses described herein provide a determination of whether a measurement offset is to be applied to the neighbor measurement based at least in part on various factors, described in more detail below. Furthermore, some techniques and apparatuses described herein provide application of the measurement offset to the neighbor measurement before the neighbor measurement is signaled and/or signaling of the measurement offset for use by a base station. Some techniques and apparatuses described herein provide for a base station to determine a DC configuration based at least in part on adjusted neighbor measurements and/or based at least in part on the measurement offsets associated with the adjusted neighbor measurements. Thus, the UE and the BS may take into account the effect of interference on a neighbor measurement for an NR band when reporting measurements and when configuring a DC configuration. This may reduce overhead and congestion associated with repeated handovers to find a low-interference band and may increase throughput on the NR band.

Figure 3:
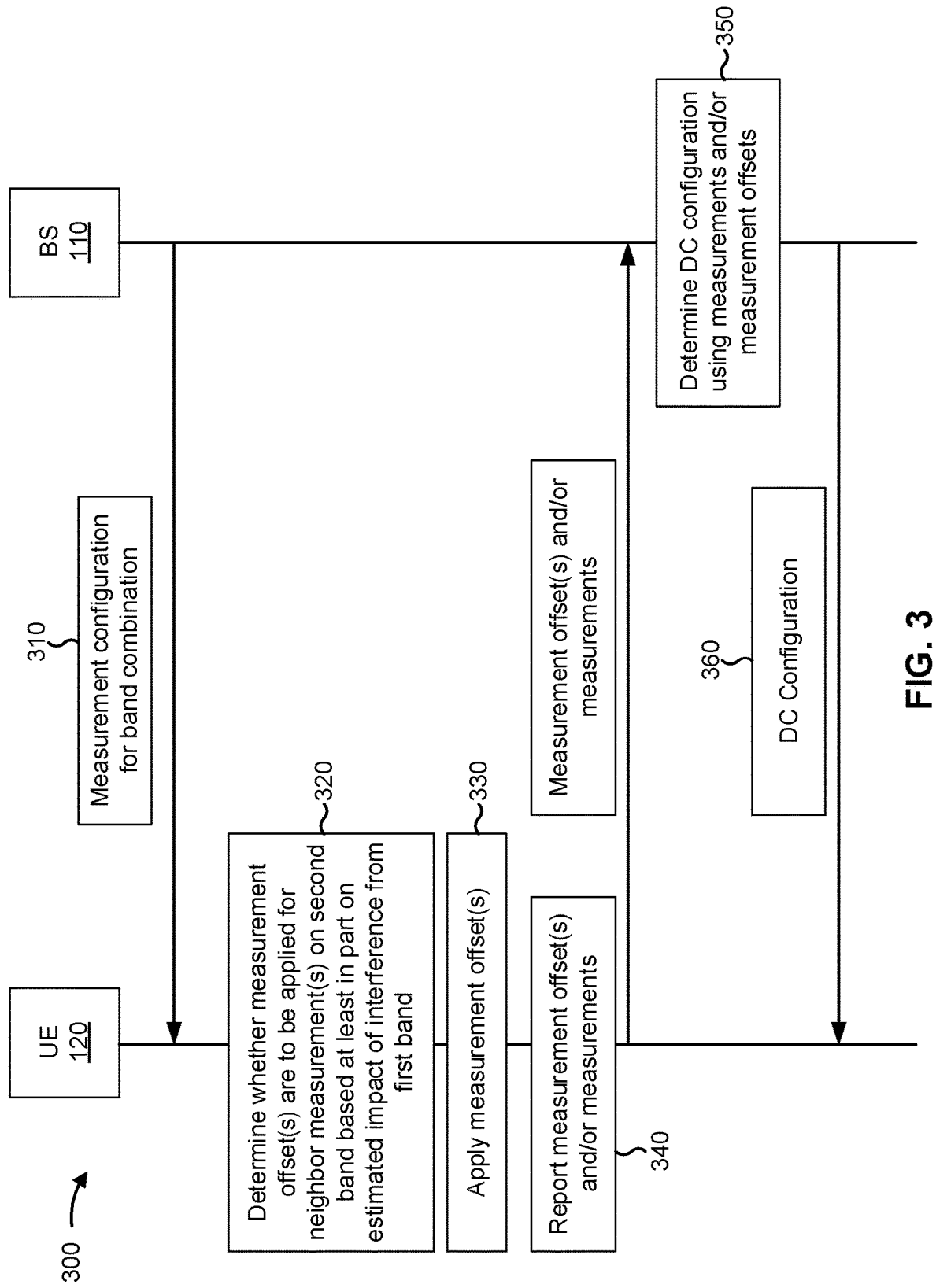
FIG. 3 is a diagram illustrating an example of determination and/or application of a measurement offset for a band combination, in accordance with various aspects of the present disclosure.

FIG. 3 is a diagram illustrating an example 300 of determination and/or application of a measurement offset for a band combination, in accordance with various aspects of the present disclosure. As shown, example 300 includes a BS 110 and a UE 120. In example 300, the UE 120 is capable of DC communication, for example, using EN-DC or another type of DC configuration.

As shown in FIG. 3, and by reference number 310, the BS 110 may provide a measurement configuration for the UE 120. The measurement configuration may identify configurations for one or more neighbor measurements to be performed by the UE 120. For example, the one or more neighbor measurements may be associated with an NR band of a DC configuration. In some aspects, the one or more neighbor measurements may be associated with respective target carriers, cells, or frequencies. A neighbor measurement may include, for example, a reference signal received power (RSRP) measurement (e.g., an SS-RSRP measurement), a reference signal received quality (RSRQ) measurement (e.g., an SS-RSRQ measurement), a signal to interference and noise ratio (SINR) value (e.g., an SS-SINR measurement), and/or the like. A measurement offset is an adjustment of a measured value of a neighbor measurement, as described in more detail elsewhere herein.

A measurement configuration is a configuration provided from the BS 110 to the UE 120 to configure the UE 120 to perform NR measurements, inter radio access technology measurements of Evolved Universal Mobile Telecommunications System (UMTS) Terrestrial Radio Access (E-UTRA) frequencies, or the like. The measurement configuration may configure the UE 120 to report measurement information based at least in part on measurement resources such as synchronization signal blocks (SSBs), channel state information reference signal (CSI-RS) resources, channel state information interference management (CSI-IM) resources, or the like. The measurement configuration may include measurement objects, reporting configurations, measurement identities, quantity configurations, measurement gap configurations, or a combination thereof. A measurement object may provide a list of objects on which the UE 120 may perform the measurements for intra-frequency and inter-frequency operations. A reporting configuration may indicate a reporting criterion, a reference signal type, and/or a reporting format for a measurement object. A measurement identity may link a measurement object with a reporting configuration. A quantity configuration may describe filter coefficients for Layer 3 filtering of the measurements. A measurement gap configuration may indicate a gap in which the UE 120 is to perform a measurement. In some aspects, the UE 120 may determine measurement information based at least in part on the one or more measurement configurations and/or may report the measurement information based at least in part on the one or more measurement configurations. In some aspects, a first set of bands may cause interference on a second set of bands. References herein to "a first band" should be understand to refer to "a first set of bands" unless otherwise indicated, and references herein to "a second band" should be understand to refer to "a second set of bands" unless otherwise indicated. The interference may be associated with a harmonic effect from the first band, an inter-modulation distortion effect from the first band, a modulated spur from the first band, a radio frequency hardware design of the UE 120, and/or the like. If neighbor measurements are configured for the second band, the first band's interference may or may not impact the neighbor measurements on the second band. For example, if the neighbor measurements are performed in a measurement gap, then the first band's interference may impact the neighbor measurements less than the first band's interference impacts DC communication on the second band. As another example, the first band's interference may impact some frequencies (e.g., some sets of resource blocks, cells, or carriers) more than other frequencies on the second band.

As shown by reference number 320, the UE 120 may determine whether one or more measurement offsets are to be applied for one or more neighbor measurements on the second band based at least in part on an estimated impact of interference from the first band. For example, the UE 120 may determine the estimated impact of interference on the second band. The UE 120 may determine whether or not to apply the one or more measurement offsets, and/or may determine the one or more measurement offsets, for the one or more neighbor measurements. The UE 120 may selectively apply the one or more measurement offsets as shown by reference number 330 (when the one or more measurement offsets are to be applied) and/or may selectively report the one or more measurement offsets and/or the modified measurements as shown by reference number 340. Each of these concepts is described in turn below.

In some aspects, the UE 120 may determine whether a measurement offset is to be applied. Additionally, or alternatively, the UE 120 may determine a value for a measurement offset. In some aspects, the UE 120 may determine whether a filtering or isolation configuration (e.g., a power amplifier or radio frequency filter, an antenna isolation configuration, a printed circuit board isolation configuration, and/or the like) of the UE 120 can suppress the interference to satisfy a threshold, and may determine the value of the measurement offset and/or whether the measurement offset is to be applied based at least in part on whether the threshold is satisfied. In some aspects, the UE 120 may determine whether a signal processing technique, such as a non-linear interference cancellation signal processing technique and/or the like, can suppress the interference to satisfy the threshold, and may determine the value of the measurement offset and/or whether the measurement offset is to be applied based at least in part on whether the threshold is satisfied.

In some aspects, the UE 120 may determine whether the measurement offset is to be applied and/or may determine a value of the measurement offset based at least in part on historical information. For example, the UE 120 may determine whether a carrier or frequency of a neighbor measurement will be impacted by the interference by reference to historical information indicating carriers or frequencies of the second band that have been impacted by interference from the first band. This may be based at least in part on a carrier bandwidth of the first band and a synchronization signal block associated with the second band that indicates the carrier or frequency. In some aspects, the BS 110 may configure a DC configuration in which the channel or frequency associated with the second band does not overlap an interference frequency range of the first band as indicated by the historical information, thereby reducing interference and increasing throughput on the second band. In some aspects, the UE 120 may store information identifying the carrier or frequency of the second band and indicating a level of interference associated with the carrier or frequency.

In some aspects, the UE 120 may determine whether the measurement offset is to be applied and/or may determine a value of the measurement offset based at least in part on determining whether the second band (e.g., a carrier of the second band, a frequency on the second band, and/or the like), taking into account the estimated impact of the interference, provides better throughput than a third band. For example, the UE 120 may determine whether the measurement offset is to be applied and/or may determine a value of the measurement offset based at least in part on a normalization factor for desense due to a difference in at least one of a channel bandwidth or a number of layers of the second band relative to one or more other bands. As an example, a band with a 100 MHz channel bandwidth and 4 layers, even when subject to interference from another band, may provide higher throughput or better performance than a band with a 20 MHz frequency division duplex (FDD) channel with 2 layers. In this case, the UE 120 may determine whether to apply the measurement offset and/or may determine the value of the measurement offset based at least in part on expected or historical throughput on the band with the 100 MHz channel bandwidth relative to the band with the 20 MHz FDD channel.

In some aspects, the UE 120 may determine whether the measurement offset is to be applied and/or may determine a value of the measurement offset based at least in part on a traffic level associated with the second band. In this case, the UE 120 may determine whether the measurement offset is to be applied and/or a value of the measurement offset based at least in part on an aggressor uplink resource block allocation of the first band and/or a victim downlink resource block allocation of the second band. For example, if the estimated impact satisfies a threshold (e.g., is lower than the threshold) based at least in part on an estimated uplink data throughput on the first band or based at least in part on a transmit power on the first band, then the UE 120 may determine that no measurement offset is to be applied. As a more particular example, if current traffic and/or expected traffic of the UE 120 is predominately downlink-centric (e.g., if there is more downlink traffic than uplink traffic in a time window or if an amount of downlink traffic relative to an amount of uplink traffic satisfies a threshold), then the UE 120 may determine that no measurement offset is to be applied.

In some aspects, the UE 120 may determine whether a measurement offset is to be applied and/or may determine a value of the measurement offset based at least in part on external interference, such as interference from a cell not associated with the UE 120. In this case, if the network is congested or network load satisfies a threshold, inter-cell interference (e.g., interference from a cell not associated with the UE 120) may negatively impact the neighbor measurement. In some aspects, the UE 120 may determine the measurement offset and/or whether the measurement offset is to be applied based at least in part on an interference level associated with the external interference. For example, if the interference level satisfies a threshold, the UE may determine a measurement offset with a value corresponding to the threshold and/or may determine that the measurement offset is to be applied.

In some aspects, the UE 120 may determine an estimated impact associated with a transmitter harmonic from the first band based at least in part on a link budget. The link budget may be based at least in part on one or more of the factors listed below:

a transmit power at a power amplifier output of the UE 120;

a nth-order harmonic relative to a carrier at a power amplifier output of the UE 120;

a printed circuit board isolation configuration of the UE 120;

a nth-order harmonic power at an input of a low noise amplifier of the UE 120;

a receiver noise of the UE 120;

an aggregate noise and interference at a low noise amplifier of the UE 120;

a signal to interference and noise (SINR) requirement of the UE 120;

a high-order receive diversity (HORxD) gain of the UE 120;

a downlink signal power requirement at an input of a low noise amplifier of the UE 120;

a front-end loss of the UE 120; or a required downlink signal at an antenna port of the UE 120.

In some aspects, the UE 120 may use any single factor or any combination of the above factors to determine whether a measurement offset is to be applied. In some aspects, the UE 120 may determine whether a measurement offset is to be applied for each frequency or carrier of a plurality of frequencies or carriers. For example, the UE 120 may determine that a measurement offset is to be applied for one or more first frequencies or carriers of the plurality of frequencies or carriers, and the UE 120 may determine that no measurement offset is to be applied for one or more second frequencies or carriers of the plurality of frequencies or carriers. Thus, the UE 120 may selectively apply measurement offsets based at least in part on estimated impacts of interference on the plurality of frequencies or carriers.

As shown by reference number 330, in some aspects, the UE 120 may apply one or more measurement offsets. For example, the UE 120 may determine the one or more measurement offsets using one or more of the techniques described above, and the UE 120 may apply the one or more measurement offsets to one or more corresponding neighbor measurements. In some aspects, the UE 120 may not apply a measurement offset to a neighbor measurement. For example, the UE 120 may report the neighbor measurement and the measurement offset, and the BS 110 may apply the measurement offset or take the measurement offset into account. This may conserve computing resources of the UE 120, whereas applying the measurement offset at the UE 120 may simplify implementation for the BS 110.

In some aspects, the UE 120 may select a frequency based at least in part on an estimated impact of the interference on the selected frequency satisfying a threshold, and the UE 120 may report information identifying the selected frequency to the BS 110. For example, the UE 120 may report a resource block range (e.g., corresponding to the selected frequency) that is subject to interference less than or equal to the threshold. In some aspects, the BS 110 may use this selected frequency to configure a DC configuration for the UE 120, as described below.

As shown by reference number 350, the BS 110 may determine a DC configuration for the UE 120 using neighbor measurements and/or measurement offsets provided by the UE 120. For example, the BS 110 may identify a best cell for the UE 120 on the second band using the neighbor measurements. As another example, the BS 110 may determine whether a best cell for the UE 120 should be changed based at least in part on the measurement offsets. As yet another example, the BS 110 may reconfigure a serving cell of the UE 120 on the first cell based at least in part on the measurement offsets, and/or the like. As shown by reference number 360, the BS 110 may provide the DC configuration to the UE 120. For example, the BS 110 may configure a cell or carrier on the second band for the UE 120, may reconfigure a cell or carrier on the first band for the UE 120, may trigger a handover or radio resource control (RRC) connection procedure for a target cell or carrier on the second band, and/or the like.

In some aspects, the BS 110 may determine a selected cell carrier on the second band based at least in part on a selected frequency of the UE 120. For example, the BS 110 may select a cell or carrier associated with the selected frequency. Thus, the BS 110 may select a cell or carrier in a frequency range of the second band based at least in part on an indication from the UE 120 that the frequency range is associated with a threshold level of interference, thus reducing interference on the second band and improving throughput.

As indicated above, FIG. 3 is provided as an example. Other examples may differ from what is described with respect to FIG. 3.

Figure 4:
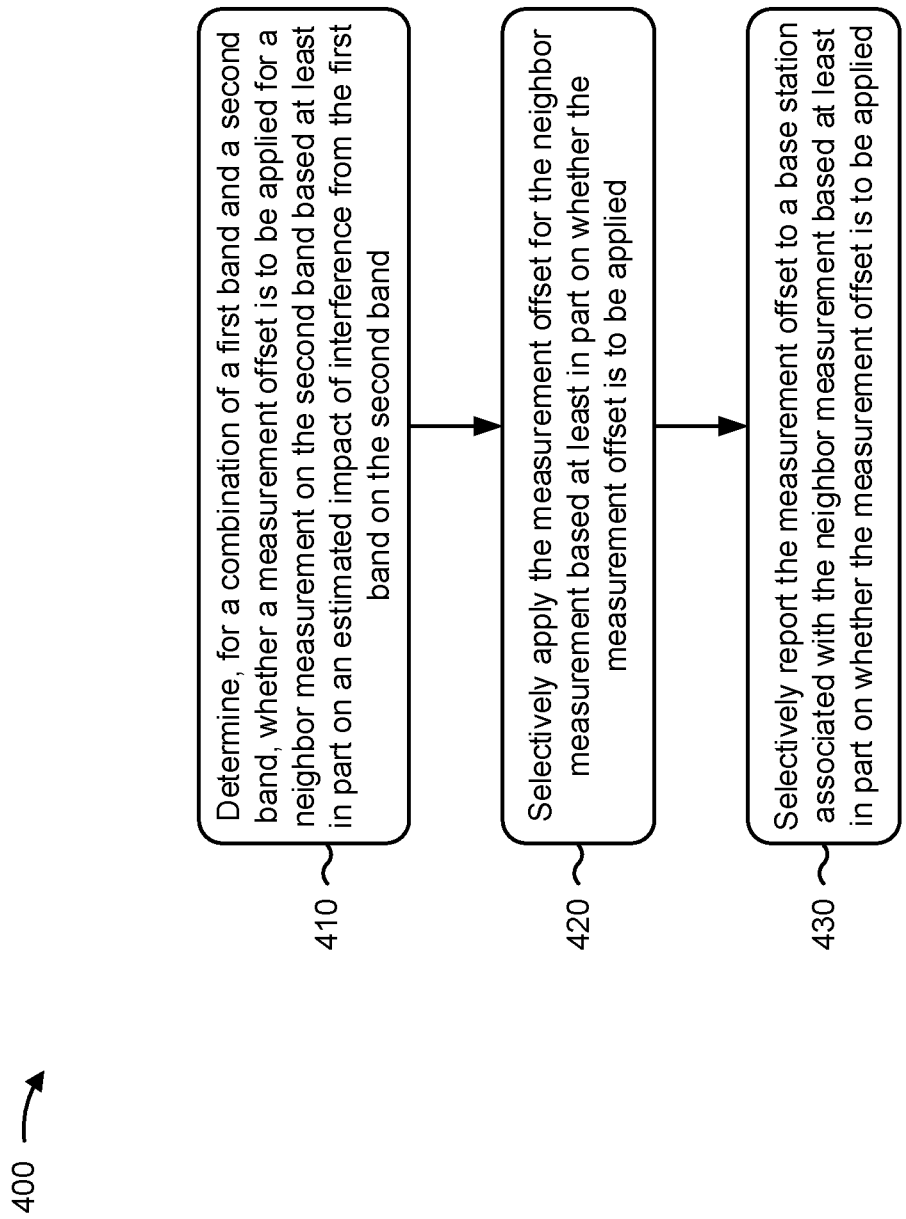
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with neighbor measurement adjustment for dual connectivity.

As shown in FIG. 4, in some aspects, process 400 may include determining, for a combination of a first band and a second band, whether a measurement offset is to be applied for a neighbor measurement on the second band based at least in part on an estimated impact of interference from the first band on the second band (block 410). For example, the UE (e.g., using antenna 252, DEMOD 254, MIMO detector 256, receive processor 258, controller/processor 280, and/or the like) may determine, for a combination of a first band and a second band, whether a measurement offset is to be applied for a neighbor measurement on the second band based at least in part on an estimated impact of interference from the first band on the second band, as described above.

As shown in FIG. 4, in some aspects, process 400 may include selectively applying the measurement offset for the neighbor measurement based at least in part on whether the measurement offset is to be applied (block 420). Additionally, or alternatively, process 400 may include selectively reporting the measurement offset to a base station associated with the neighbor measurement based at least in part on whether the measurement offset is to be applied (block 430). For example, the UE (e.g., using controller/processor 280, transmit processor 264, TX MIMO processor 266, MOD 254, antenna 252, and/or the like) may apply the measurement offset for the neighbor measurement based at least in part on determining that the measurement offset is to be applied. (e.g., using controller/processor 280, transmit processor 264, TX MIMO processor 266, MOD 254, antenna 252, and/or the like) may report the measurement offset without applying the measurement offset to the neighbor measurement. In some aspects, the UE may report the measurement offset and the measurement.

Process 400 may include additional aspects, such as any single aspect or any combination of aspects described below and/or in connection with one or more other processes described elsewhere herein.

In a first aspect, the neighbor measurement is one of a plurality of neighbor measurements associated with a plurality of frequencies of the second band, and determining whether the measurement offset is to be applied for the neighbor measurement on the second band comprises determining whether the measurement offset is to be applied for the plurality of neighbor measurements based at least in part on respective estimated impacts of the interference from the first band on the plurality of frequencies.

In a second aspect, alone or in combination with the first aspect, process 400 includes applying the measurement offset for a first neighbor measurement of the plurality of neighbor measurements, wherein the measurement offset is not applied for a second neighbor measurement of the plurality of neighbor measurements.

In a third aspect, alone or in combination with one or more of the first and second aspects, process 400 includes (e.g., using controller/processor 280, transmit processor 264, TX MIMO processor 266, MOD 254, antenna 252, and/or the like) selecting a frequency, of the plurality of frequencies, based at least in part on a respective estimated impact of the interference on the selected frequency satisfying a threshold; and reporting the selected frequency to the base station.

In a fourth aspect, alone or in combination with one or more of the first through third aspects, process 400 includes selectively applying (e.g., using controller/processor 280, transmit processor 264, TX MIMO processor 266, MOD 254, antenna 252, and/or the like) the measurement offset for the neighbor measurement; and selectively reporting the measurement offset to the base station.

In a fifth aspect, alone or in combination with one or more of the first through fourth aspects, the interference from the first band on the second band is associated with one or more of: a harmonic effect from the first band, an inter-modulation distortion effect from the first band, a modulated spur from the first band, or a radio frequency hardware design of the UE.

In a sixth aspect, alone or in combination with one or more of the first through fifth aspects, determining whether the measurement offset is to be applied comprises determining whether a filtering or isolation configuration of the UE can suppress the interference to satisfy a threshold.

In a seventh aspect, alone or in combination with one or more of the first through sixth aspects, determining whether the measurement offset is to be applied comprises determining whether a signal processing technique of the UE can suppress the interference to satisfy a threshold.

In an eighth aspect, alone or in combination with one or more of the first through seventh aspects, determining whether the measurement offset is to be applied is based at least in part on determining, using historical information, a magnitude of the estimated impact of the interference from the first band on the second band.

In a ninth aspect, alone or in combination with one or more of the first through eighth aspects, determining whether the measurement offset is to be applied is based at least in part on determining whether the second band, taking into account the estimated impact of the interference, provides better throughput than a third band.

In a tenth aspect, alone or in combination with one or more of the first through ninth aspects, determining whether the measurement offset is to be applied is based at least in part on a traffic level associated with the second band.

In an eleventh aspect, alone or in combination with one or more of the first through tenth aspects, the estimated impact of the interference is determined based at least in part on a link budget of the UE.

In a twelfth aspect, alone or in combination with one or more of the first through eleventh aspects, process 400 includes determining the measurement offset based at least in part on at least one of: the combination of the first band and the second band, an interference type of the interference, an uplink resource block allocation of the first band, a downlink resource block allocation of the second band, a modified estimated impact of the interference after factoring in radio frequency filter suppression or interference cancellation gain, a normalization factor for desense due to a difference in at least one of channel bandwidth or a number of layers of the second band relative to one or more other bands, an estimate of uplink traffic in a time window, a current traffic type of the UE, historical information, or interference from a cell not associated with the UE.

In a thirteenth aspect, alone or in combination with one or more of the first through twelfth aspects, process 400 includes receiving (e.g., using antenna 252, DEMOD 254, MIMO detector 256, receive processor 258, controller/processor 280, and/or the like) a dual connectivity configuration based at least in part on applying the measurement offset to the neighbor measurement or reporting the measurement offset to the base station.

In a fourteenth aspect, alone or in combination with one or more of the first through thirteenth aspects, the first band comprises a first set of bands associated with one or more serving cells of the UE Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
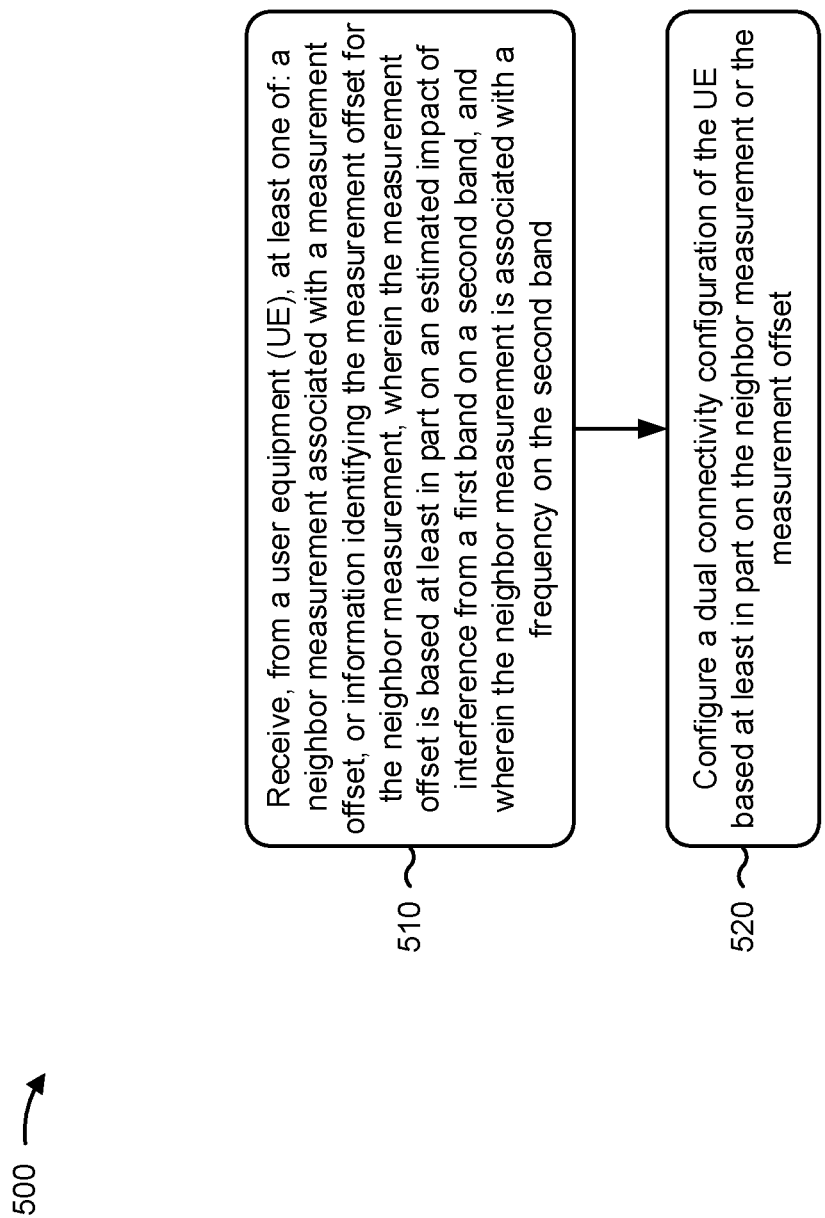
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where the base station (e.g., BS 110 and/or the like) performs operations associated with neighbor measurement adjustment for dual connectivity.

As shown in FIG. 5, in some aspects, process 500 may include receiving, from a UE, at least one of: a neighbor measurement associated with a measurement offset, or information identifying the measurement offset for the neighbor measurement, wherein the measurement offset is based at least in part on an estimated impact of interference from a first band on a second band, and wherein the neighbor measurement is associated with a frequency on the second band (block 510). For example, the base station (e.g., using antenna 234, DEMOD 232, MIMO detector 236, receive processor 238, controller/processor 240, and/or the like) may receive, from a user equipment (UE), at least one of a neighbor measurement associated with a measurement offset, or information identifying the measurement offset for the neighbor measurement, as described above. The measurement offset may be based at least in part on an estimated impact of interference from a first band on a second band. The neighbor measurement may be associated with a frequency on the second band.

As further shown in FIG. 5, in some aspects, process 500 may include configuring a dual connectivity configuration of the UE based at least in part on the neighbor measurement or the measurement offset (block 520). For example, the base station (e.g., using controller/processor 240, transmit processor 220, TX MIMO processor 230, MOD 232, antenna 234, and/or the like) may configure a dual connectivity configuration of the UE based at least in part on the neighbor measurement or the measurement offset, as described above.

Process 500 may include additional aspects, such as any single aspect or any combination of aspects described below and/or in connection with one or more other processes described elsewhere herein.

In a first aspect, the frequency is one of a plurality of frequencies associated with a plurality of neighbor measurements, and the method further comprises receiving information identifying a selected frequency, of the plurality of frequencies, based at least in part on an estimated impact of the interference on the selected frequency satisfying a threshold, wherein configuring the dual connectivity configuration is based at least in part on the information identifying the selected frequency.

In a second aspect, alone or in combination with the first aspect, the interference from the first band on the second band is associated with one or more of: a harmonic effect from the first band, an inter-modulation distortion effect from the first band, a modulated spur from the first band, or a radio frequency hardware design of the UE.

In a third aspect, alone or in combination with one or more of the first and second aspects, the measurement offset is based at least in part on at least one of: a combination of the first band and the second band, an interference type of the interference, an uplink resource block allocation of the first band, a downlink resource block allocation of the second band, a modified estimated impact of the interference after factoring in radio frequency filter suppression or interference cancellation gain, a normalization factor for desense due to a difference in at least one of channel bandwidth or a number of layers of the second band relative to one or more other configured bands, an estimate of uplink traffic in a time window, a current traffic type of the UE, historical information, or interference from a cell not associated with the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. An apparatus for wireless communication, comprising:
a memory comprising instructions; and
one or more processors configured to execute the instructions and cause the apparatus to:
determine whether a measurement offset is to be applied for a neighbor measurement on a first band based at least in part on an interference from a second band on the first band when the apparatus is communicating using the first band and the second band, wherein the measurement offset is an adjustment of a value of the neighbor measurement; and
apply the measurement offset for the neighbor measurement based at least in part on whether the measurement offset is to be applied; or
report the measurement offset to a network node associated with the neighbor measurement based at least in part on whether the measurement offset is to be applied.

2. The apparatus of claim 1, wherein the neighbor measurement is one of a plurality of neighbor measurements associated with a plurality of frequencies of the first band, and wherein whether the measurement offset is to be applied for the neighbor measurement on the first band is based on interference from the second band on the plurality of frequencies.

3. The apparatus of claim 2, wherein the measurement offset is only applied for a first neighbor measurement of the plurality of neighbor measurements.

4. The apparatus of claim 2, wherein the one or more processors are further configured to cause the apparatus to:
select a frequency, of the plurality of frequencies, based on a respective interference on the frequency satisfying a threshold,
wherein the frequency is reported to the network node.

5. The apparatus of claim 1, wherein the measurement offset is applied for the neighbor measurement and the measurement offset is reported to the network node.

6. The apparatus of claim 1, wherein the interference from the second band on the first band is associated with at least one of:
a harmonic effect from the second band,
an inter-modulation distortion effect from the second band,
a modulated spur from the second band, or
a radio frequency hardware design of the apparatus.

7. The apparatus of claim 1, wherein whether the measurement offset is to be applied is further based on whether a filtering configuration or an isolation configuration of the apparatus can suppress the interference to satisfy a threshold.

8. The apparatus of claim 1, wherein whether the measurement offset is to be applied is further based on whether a signal processing technique of the apparatus can suppress the interference to satisfy a threshold.

9. The apparatus of claim 1, wherein whether the measurement offset is to be applied is determined based on a magnitude of the interference.

10. The apparatus of claim 1, wherein whether the measurement offset is to be applied is further based on whether the first band provides better throughput than a third band.

11. The apparatus of claim 1, wherein whether the measurement offset is to be applied is further based on a traffic level associated with the first band.

12. The apparatus of claim 1, wherein the interference is based on a link budget of the apparatus.

13. The apparatus of claim 1, wherein the measurement offset is based on at least one of:
a combination of the first band and the second band,
a type of the interference,
an uplink resource block allocation of the first band,
a downlink resource block allocation of the second band,
a modified interference after factoring in radio frequency filter suppression or interference cancellation gain,
a normalization factor for desense due to a difference in at least one of channel bandwidth or a number of layers of the second band relative to one or more other bands,
an estimate of uplink traffic in a time window,
a current traffic type of the apparatus,
historical information, or
interference from a cell not associated with the apparatus.

14. The apparatus of claim 1, wherein the one or more processors are further configured to cause the apparatus to:
receive a dual connectivity configuration based on the measurement offset being applied to the neighbor measurement or the measurement offset being reported to the network node.

15. The apparatus of claim 1, wherein the first band comprises a first set of bands associated with one or more serving cells of the apparatus.

16. An apparatus for wireless communication, comprising:
a memory comprising instructions; and
one or more processors configured to execute the instructions and cause the apparatus to:
receive, from a user equipment (UE), information identifying a modified neighbor measurement based at least in part on a measurement offset, wherein the measurement offset is an adjustment of a value of a neighbor measurement associated with an interference from a first band on a second band, and
wherein the neighbor measurement is associated with a frequency on the second band; and
configure a dual connectivity configuration of the UE based at least in part on the modified neighbor measurement.

17. The apparatus of claim 16, wherein the frequency is one of a plurality of frequencies associated with a plurality of neighbor measurements including the neighbor measurement, and wherein the one or more processors are further configured to cause the apparatus to:
receive information identifying a frequency, of the plurality of frequencies, based on an interference on the frequency satisfying a threshold, wherein the dual connectivity configuration is configured based on the information identifying the frequency.

18. The apparatus of claim 16, wherein the interference from the first band on the second band is associated with at least one of:
a harmonic effect from the first band,
an inter-modulation distortion effect from the first band,
a modulated spur from the first band, or
a radio frequency hardware design of the UE.

19. The apparatus of claim 16, wherein the measurement offset is based on at least one of:
a combination of the first band and the second band,
a type of the interference,
an uplink resource block allocation of the first band,
a downlink resource block allocation of the second band,
a modified interference after factoring in radio frequency filter suppression or interference cancellation gain,
a normalization factor for desense due to a difference in at least one of channel bandwidth or a number of layers of the second band relative to one or more other configured bands,
an estimate of uplink traffic in a time window,
a current traffic type of the UE,
historical information, or
interference from a cell not associated with the UE.

20. A method of wireless communication performed at a user equipment (UE), comprising:
determining whether a measurement offset is to be applied for a neighbor measurement on a first band based at least in part on an interference from a first second band on the first band when the UE is communicating using the first band and the second band, wherein the measurement offset is an adjustment of a value of the neighbor measurement; and
applying the measurement offset for the neighbor measurement based at least in part on whether the measurement offset is to be applied; or
reporting the measurement offset to a network node associated with the neighbor measurement based at least in part on whether the measurement offset is to be applied.

21. The method of claim 20, wherein the neighbor measurement is one of a plurality of neighbor measurements associated with a plurality of frequencies of the first band, and wherein whether the measurement offset is to be applied for the neighbor measurement on the first band is based on interference from the second band on the plurality of frequencies.

22. The method of claim 21, the measurement offset is only applied for a first neighbor measurement of the plurality of neighbor measurements.

23. The method of claim 21, further comprising:
selecting a frequency, of the plurality of frequencies, based on a respective interference on the selected frequency satisfying a threshold,
wherein the selected frequency is reported to the network node.

24. The method of claim 20, wherein the measurement offset is applied for the neighbor measurement and the measurement offset is reported to the network node.

25. The method of claim 20, wherein whether the measurement offset is to be applied is determined based at least in part on at least one of:
whether a signal processing technique of the UE can suppress the interference to satisfy a threshold, or
a magnitude of the interference.

26. The method of claim 20, wherein the interference is based on a link budget of the UE.

27. The method of claim 20, further comprising:
receiving a dual connectivity configuration based at least in part on applying the measurement offset to the neighbor measurement or reporting the measurement offset to the network node.

28. A method of wireless communication performed at a network node, comprising:
receiving, from a user equipment (UE), information identifying a modified neighbor measurement based at least in part on a measurement offset,
wherein the measurement offset is an adjustment of a value of a neighbor measurement based at least in part on an estimated impact of interference from a first band on a second band, and
wherein the neighbor measurement is associated with a frequency on the second band; and
configuring a dual connectivity configuration of the UE based at least in part on the modified neighbor measurement.

29. The method of claim 28, wherein the frequency is one of a plurality of frequencies associated with a plurality of neighbor measurements including the neighbor measurement, and wherein the method further comprises:
receiving information identifying a frequency, of the plurality of frequencies, based on an of the interference on the frequency satisfying a threshold, wherein the dual connectivity configuration is configured based on the information identifying the frequency.

30. The method of claim 28, wherein the measurement offset is based on at least one of:
a combination of the first band and the second band,
a type of the interference,
an uplink resource block allocation of the first band,
a downlink resource block allocation of the second band,
a modified interference after factoring in radio frequency filter suppression or interference cancellation gain,
a normalization factor for desense due to a difference in at least one of channel bandwidth or a number of layers of the second band relative to one or more other configured bands,
an estimate of uplink traffic in a time window,
a current traffic type of the UE,
historical information, or
interference from a cell not associated with the UE.

31. The apparatus of claim 1, further comprising:
a transmitter via which the measurement offset is reported to the network node, wherein the apparatus is configured as a user equipment.

32. The apparatus of claim 16, further comprising:
a receiver via which the information identifying the modified neighbor measurement is received from the UE, wherein the apparatus is configured as a network node.

\* \* \* \* \*